(12) United States Patent  
Shanks et al.

(10) Patent No.: US 6,321,637 B1
(45) Date of Patent: Nov. 27, 2001

(54) LOW-PROFILE AIR FILTER MODULE

(75) Inventors: Anthony E. Shanks; Patrick J. Monnens, both of Prior Lake; Richard R. Bahn, Loretto, all of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/475,577

(22) Filed: Dec. 30, 1999

(51) Int. Cl.[7] .................................................. B01D 46/00
(52) U.S. Cl. ...................... 095/273; 055/385.2; 055/467; 055/486; 096/135; 096/142
(58) Field of Search ................. 96/134, 135, 138, 96/142; 55/385.2, 467, 471, 472, 473, 486, 487, 482, 483, 484, 485; 95/273

(56) References Cited

U.S. PATENT DOCUMENTS

| | | | |
|---|---|---|---|
| 3,986,850 | * 10/1976 | Wilcox | 55/484 |
| 4,088,463 | * 5/1978 | Smith | 55/484 |
| 4,178,159 | * 12/1979 | Fecteau | 55/473 |
| 4,514,197 | * 4/1985 | Armbruster | 55/385.2 |
| 4,523,588 | 6/1985 | Dolsky . | |
| 4,534,775 | 8/1985 | Frazier . | |
| 4,790,863 | * 12/1988 | Nobiraki et al. | 55/473 |
| 4,846,859 | * 7/1989 | Nobiraki et al. | 55/473 |
| 4,917,713 | * 4/1990 | Helmus | 55/473 |
| 4,955,997 | * 9/1990 | Robertson, III | 55/385.2 |
| 4,961,764 | * 10/1990 | Develle et al. | 55/385.2 |
| 5,014,608 | * 5/1991 | Benson et al. | 55/467 |
| 5,022,900 | * 6/1991 | Bar-Yona et al. | 55/473 |
| 5,053,065 | * 10/1991 | Garay et al. | 55/473 |
| 5,141,540 | * 8/1992 | Helmus | 55/473 |
| 5,167,681 | * 12/1992 | O'Keefe et al. | 55/473 |
| 5,302,354 | 4/1994 | Watvedt et al. . | |
| 5,348,563 | 9/1994 | Davis . | |
| 5,562,286 | 10/1996 | Brinket . | |
| 5,607,647 | * 3/1997 | Kinkead | 55/485 |
| 5,626,820 | * 5/1997 | Kinkead et al. | 55/485 |
| 5,865,880 | * 2/1999 | Matsui | 55/485 |
| 5,942,323 | 8/1999 | England . | |
| 5,961,702 | 10/1999 | Doneit . | |
| 6,174,341 | * 1/2001 | Burge | 55/385.2 |

OTHER PUBLICATIONS

United Air Specialties, Inc., Advertisement Brochure entitled, "Crystal–Aire Modular Air Cleaning Systems", © 1992, pp. 1–4.

* cited by examiner

Primary Examiner—Duane S. Smith
(74) Attorney, Agent, or Firm—Dicke, Billig & Czaja, P.A.

(57) ABSTRACT

A filter module for use with a room air-purifying system. The filter module includes a housing and a filter. The housing forms an air inlet, a first outlet port and a second outlet port. The outlet ports are configured for fluid connection to commercial ductwork. The filter is maintained by the housing and is configured to retain air-borne contaminants. During use, airflow passes from the filter to the outlet ports. By incorporating at least two outlet ports, the filter module preferably assumes a low-profile configuration, thereby facilitating installation of the filter module at any desired location relative to a room of interest.

32 Claims, 4 Drawing Sheets

LOW-PROFILE AIR FILTER MODULE

BACKGROUND OF THE INVENTION

The present invention relates to a filter module for use with an air-purifying system. More particularly, it relates to a low-profile filter module configured for convenient installation in commercial settings.

In recent years, there has been a growing interest to improve environmental air conditions in homes and in commercial settings, such as offices, restaurants, taverns, bowling alleys, hospitals, laboratories, lavatories, and the like. As more information has been made available to the public concerning the hazards of indoor air pollution, there has been an increased demand for filtering devices that can be used to effectively improve air quality.

A self-contained, stand-alone air-cleaning or filtration unit is normally employed to clean air in both residential and commercial settings. Stand-alone air filtration units can assume a wide variety of forms, but generally include a housing maintaining one or more applicable filter materials and a fan or blower unit. The housing defines an inlet, at which the filter material(s) is disposed, as well as an outlet or exhaust port. Most commercial applications include a false ceiling, such that the housing is readily "hidden" above the ceiling, with only the inlet (or an associated grille) being visible to persons within the room. During use, the fan or blower unit is operated to draw room air through the filter via the inlet. The filter material or media removes undesirable air-borne particles and/or odors, such as dust, smoke, pollen, molds, etc. from the air stream. Following interaction with the filter material, the now "cleansed" air is forced, via the blower, back into the room through the outlet. A continuous intake and supply of air preferably generates a desired air re-circulation pattern within the room.

While the self-contained air-filtering device is well accepted, certain potential drawbacks have been identified. For example, in order to adequately filter and re-circulate air in an average-sized room (e.g. 2000–5000 square feet), the stand-alone unit must be relatively large. In other words, the blower unit or fan(s) is typically substantially sizable for creating adequate airflow or pressure differential, such as a 1 or 2 horsepower motor. Similarly, in order to remove different sizes and types of air-borne contaminants on a long-term basis, the filter is normally comprised of at least two filter medias, including a primary particulate filter and a sorbent material filter. The particulate filter is provided to remove air-borne particles and fibers, such as a high efficiency particulate arrestance (HEPA) filter. The sorbent material filter removes gaseous contaminants and odors, such as tobacco odors, volatile organic compounds (VOCs), etc. The most effective form of sorbent material filter includes a sorbent material, such as charcoal, potassium permanganate, or zeolite, in granular form. To facilitate long-term use in a commercial application, a relatively large volume of granular sorbent material is provided, on the order of at least 10 pounds.

Taken in combination, the large blower unit and several filter materials render the resulting air filtration unit relatively heavy and large. As a point of reference, a self-contained, commercial air filtration unit incorporating both a particulate filter and a sorbent material filter may weigh as much as 150 pounds and have a housing height on the order of 14 inches.

The above-described weight and size characteristics render installation or re-installation of a self-contained, commercial air filtration unit quite cumbersome. For many commercial applications, rooms (such as offices, smoking areas, etc.) are constantly reconfigured to meet the needs of different uses or occupants. While a location of an air filtration unit may be optimal for one room configuration, that same positioning may be highly inefficient for the new configuration. Under these circumstances, the bulky air filtration unit must be removed and re-installed to a new, more desirable location. Obviously, this is a difficult task.

A related concern arises with commercial settings employing a false ceiling to which the air filtration unit is installed. The building infrastructure associated with virtually all commercial settings includes a number of auxiliary equipment extending above, but in close proximity to, the false ceiling. For example, most commercial applications include sprinkler systems, electrical wiring, light fixtures, heating, ventilation, and air conditioning (HVAC) ducts, hot and cold water pipes, etc. The presence of this auxiliary equipment may reduce the space available for installation of the commercial air filtration unit. That is to say, due to the requisite height of the unit's housing, immovable auxiliary equipment may impede installation of the cleaning unit at a preferred location.

One potential solution to the above-described problems is providing the blower and filter as separate modules. The resulting modular air-cleaning system would afford the ability to more easily locate and relocate the now separate filter module. In theory, by forming the filter module to include only a housing and requisite filter material(s), the resulting filter module would have a reduced height as compared to a stand-alone air-cleaning unit. Likely due to the industry acceptance of self-contained air-cleaning units, as well as the engineering obstacles presented by a modular configuration, it is believed that no such product currently exists. In fact, only one potential system has been identified, advertised as being available under the trade name Crystal-Aire® by United Air Specialists, Inc. of Cincinnati, Ohio. According to a trade brochure, this air-cleaning system apparently includes separate blower and filter units designed to be connectable by a single duct. This configuration purportedly allows the blower unit to be installed apart from the filter unit. However, the blower unit has only one inlet and one outlet, such that the system is essentially restricted to a single filter unit. In theory, it may be possible to connect two or more filter units in series to the blower unit. Unfortunately, overall filter efficiency may be greatly reduced. In this regard, the blower unit and the filter unit are connected by a relatively large duct, described as being 16 inches in diameter. The filter module's housing must provide a correspondingly sized outlet port. As a result, regardless of type and/or configuration of filter materials, the required duct diameter dictates that the filter unit's housing have a height greater than 16 inches. In fact, the filter unit is advertised as having a height of 19 inches.

The above-described reliance upon a 16-inch diameter duct coincides with industry standards for commercial HVAC ductwork. Another commonly employed duct diameter is 12 inches. In either case, a resulting filter module in accordance with the advertised Crystal-Aire® system will have a height of at least 14 inches. As a result, even with the one identified modular design, it is highly likely that auxiliary equipment located above a false ceiling will impede installation of the filter module at a desired location. Notably, the cross-sectional area provided by the duct and therefore the filter unit's outlet port bears a direct relationship to the operational parameters of the blower unit. In particular, a reduction in the duct and outlet port cross-sectional area requires an increase in the operational speed (e.g., RPM) of the blower unit to achieve a desired airflow rate. While blower motors can undoubtedly be sized to satisfy most airflow requirements, elevated operational speeds result in increased noise levels. In other words, even if a smaller diameter duct were employed, the associated power increase required of the blower unit may result in unacceptable noise levels.

Air-purifying systems are extremely popular and beneficial. However, the standard "self-contained" design is highly inflexible, and may be difficult to install and/or reposition. While suggestions for a potential modular design appear promising, certain concerns relating filter module size remain. Therefore, a need exists for a modular air-purifying system including a low-profile filter module with optimal installation and performance capabilities.

SUMMARY OF THE INVENTION

One aspect of the present invention relates to a filter module for use with a commercial air-purifying system. The filter module includes a housing and a filter. The housing forms an air inlet, a first outlet port and a second outlet port. Each of the outlet ports are configured for fluid connection to commercial ductwork. The filter is maintained by the housing and is configured to retain air-borne contaminates. During use, airflow passes from the filter to the outlet ports. By forming the housing to include at least two outlet ports, the filter module preferably assumes a low-profile configuration. For example, in one preferred embodiment, the outlet ports are formed side-by-side, each having a diameter of less than 11 inches. With this configuration, an overall height of the filter module is greatly reduced, thereby facilitating installation of the filter module at a desired location.

Another aspect of the present invention relates to an air-purifying system. The system includes a blower module, a filter module and at least two ducts. The filter module is spaced from the blower module. The two ducts extend from the blower module to the filter module, fluidly connecting the two components. By fluidly connecting the blower and filter modules with more than a single duct, the system allows for operation of the blower module at lower speeds while achieving desired airflow. Further, in one preferred embodiment, the filter module assumes a low-profile configuration by forming two, side-by-side outlet ports.

Yet another aspect of the present invention relates to a method of installing a commercial air-purifying system for cleaning room air. The method includes installing a blower module. A filter module is provided having a housing and a filter maintained by the housing. In this regard, the housing forms an inlet, a first outlet port, and a second outlet port. The filter module is installed over the room of interest, such that the filter module is spaced from the blower module and the inlet is positioned to receive air from the room. A first duct is extended from the first outlet port to the blower module. Similarly, a second duct is extended from the second outlet port to the blower module. With this configuration, the ducts fluidly connect the blower module to the filter module. During operation, the blower module draws air of the room into the filter module for removal of air-borne contaminants. In one preferred embodiment, the ducts are configured to be flexible such that the ducts can be articulated about auxiliary equipment, such as HVAC ductwork, water pipes, sprinkler systems, etc., associated with the room.

DESCRIPTION OF THE PREFERRED EMBODIMENTS

Figure 1:
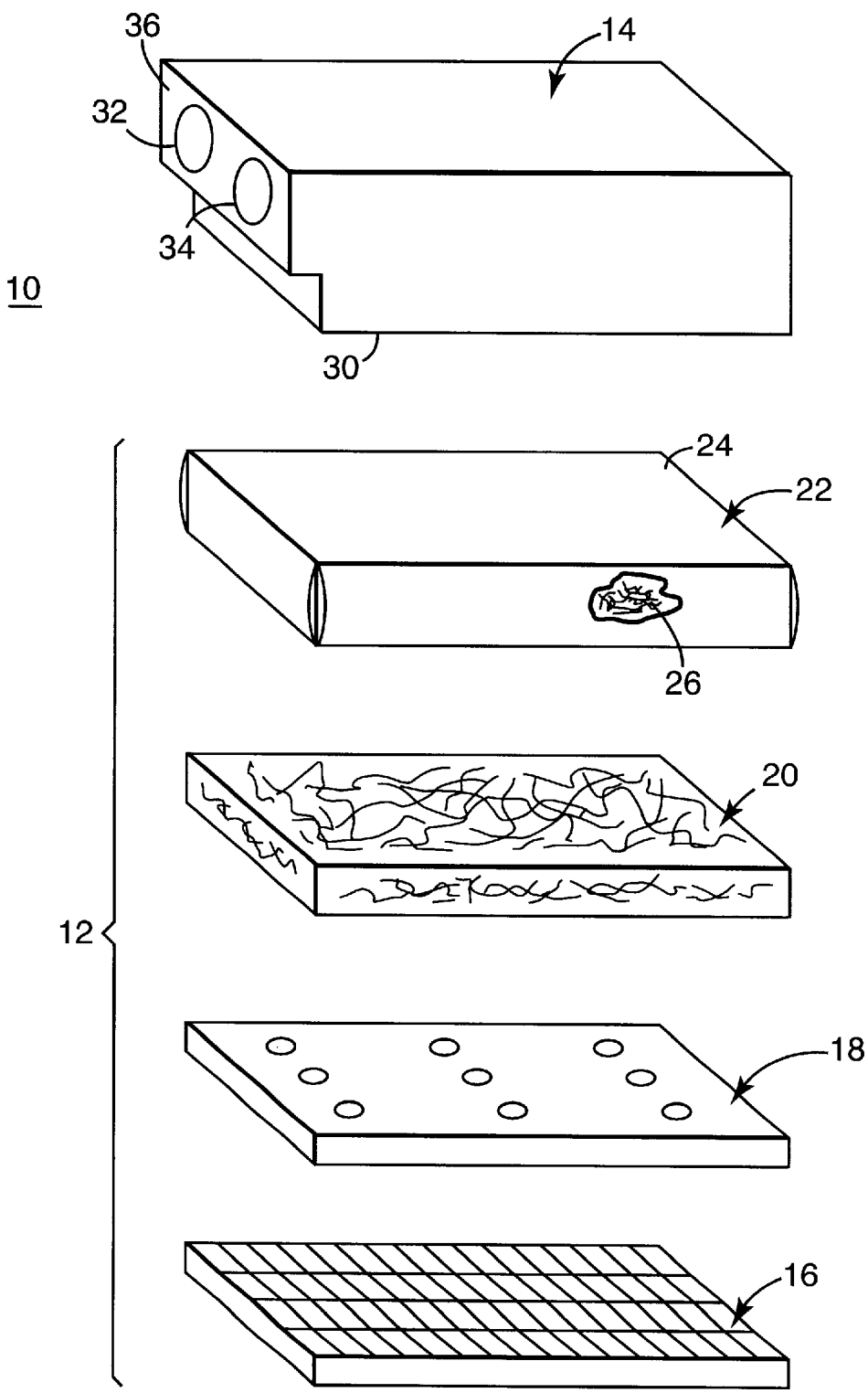
FIG. 1 is an exploded perspective view of a filter module in accordance with the present invention.

One preferred embodiment of a filter module 10 in accordance with the present invention is shown in FIG. 1. Filter module 10 includes a filter assembly 12 and a housing 14. Details on the various components are provided below. In general terms, however, housing 14 is configured to maintain filter assembly 12.

In one preferred embodiment, filter assembly 12 includes an intake grille 16, a pre-filter 18, a primary particulate filter 20 and a sorbent material filter 22. Each component of filter assembly 12 corresponds generally in size with a size of housing 14.

Grille 16 is sized to encompass a lower portion (or inlet) of housing 14. Grille 16 is preferably an egg crate grille, formed from hardened plastic, as is known in the art. Alternatively, other relatively rigid materials are equally acceptable, such as aluminum. Grille 16 is provided to capture large, air-borne fibers as well as to render filter module 10 aesthetically pleasing. In this regard, upon final assembly and installation of filter module 10, grille 16 will be the only component viewable by a room occupant. Preferably, grille 16 is configured to be selectively detachable from housing 14.

Pre-filter 18 can assume a wide variety of forms and is preferably configured to retain relatively large air-borne particles. For example, pre-filter 18 can be a lightweight impingement filter, such as open cell foam, cellulose, etc., preferably having a thickness of approximately 1-inch. Other known materials, such as aluminum mesh screens, reinforced cotton fibers, etc., able trap relatively large particles, such as dust and pet hairs, are equally acceptable. In one preferred embodiment, pre-filter 18 is configured to be selectively detachable from housing 14. For example, pre-filter 18 may nest on top of grille 16.

Primary particulate filter 20 is employed to remove relatively small fibers or particles, such as pollen, molds, bacteria, etc. A well-known example of an acceptable primary particulate filter is a high-efficiency particulate arrestance (HEPA) filter. HEPA filters are generally comprised of intertwined, small (less than 1 micron) glass fibers and have a minimum efficiency of 99.97% relative to 0.3 micron dioctyl phthalate (DOP) particles. Alternatively, primary particulate filter 20 can assume other forms/structures (with lower efficiencies) known in the art, such as cellulose, wool felt or glass fiber filters with efficiencies ranging from 30%–95% ASHREA rated dust spot efficiency. In one preferred embodiment, primary particulate filter 20 is a HEPA filter having a thickness of approximately 3 inches.

Sorbent material filter 22 is also well-known in the art and provides enhanced filtering of gaseous contaminants and odors (e.g., tobacco smoke odors, cooking odors, VOCs, etc.). Sorbent material filter 22 typically includes a relatively large volume of an appropriate sorbent material, or a combination of sorbent materials, in either granular or impregnated form. In one preferred embodiment, sorbent material filter 22 includes an encasement 24, such as a flexible bag, containing a granular sorbent material 26. Granular sorbent material 26 adsorbs gaseous contaminants and odor from airflow. Sorbent materials identified as being most effective in removing odors include charcoal or carbon, potassium permanganate and zeolite. In fact, an extremely popular sorbent material is available under the trade name CPZ™, generally composed of 60% charcoal or carbon, 20% potassium permanganate and 20% zeolite. In a preferred embodiment, granular sorbent material 26 is approximately 10 pounds of CPZ™, contained within flexible bag 24 having a length of approximately 25 inches and a width of 21.5 inches. With this configuration, sorbent material filter 22 has an overall thickness (or height) of approximately 2.25 inches. Alternatively, other sorbent materials, configurations and sizes are equally acceptable. For example, sorbent material filter 22 can include a relatively rigid encasement maintaining a sorbent material in granular form. Even further, sorbent material filter 22 can be an impregnated sorbent material maintained by a frame.

In one preferred embodiment, primary particulate filter 20 and sorbent material filter 22 are coupled to one another by a frame (not shown). With this embodiment, the frame is preferably selectively securable within housing 14, thereby facilitating relatively easy filter replacement.

Although filter assembly 12 has been preferably described as including grille 16, pre-filter 18, primary particulate filter 20 and sorbent material filter 22, other configurations are equally acceptable. For example, one or more of grille 16, pre-filter 18, primary particulate filter 20 and/or sorbent material filter 22 can be eliminated, depending upon the needs presented by a particular application of filter module 10. Even further, other known filter materials can be employed as, or as part of, filter assembly 12.

As previously described, housing 14 is configured to maintain filter assembly 12, and defines an overall height of filter module 10. With this in mind, housing 14 forms an air inlet 30 (shown partially in FIG. 1), a first outlet port 32 and a second outlet port 34. Air inlet 30 is sized to facilitate passage of air into housing 14, and is sized in accordance with grille 16, previously described.

Figure 2:
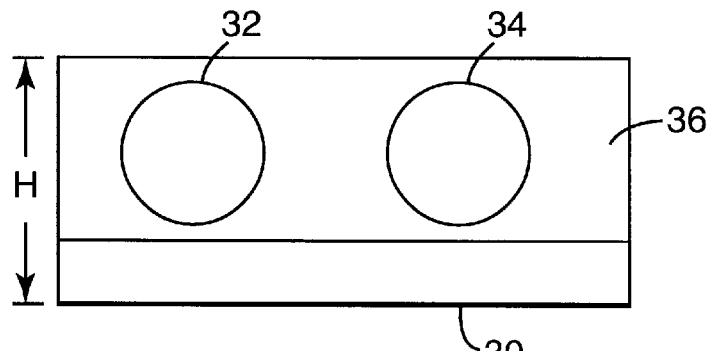
FIG. 2 is a side view of a housing portion of the filter module of FIG. 1.

The relationship of outlet ports 32, 34 relative to housing 14 is best shown in FIG. 2. Each of outlet ports 32, 34 are configured to fluidly connected housing 14, and thus filter module 10, to ductwork (not shown). In a preferred embodiment, outlet ports 32, 34 are preferably formed side-by-side at a sidewall 36 of housing 14. With this side-by-side configuration, an overall height H of housing 14, and thus of filter module 10 (FIG. 1), is greatly reduced. Along these same lines, by providing at least two of outlet ports 32, 34, a size of each of outlet ports 32, 34 can be minimized while still achieving sufficient airflow through filter module 10 under normal, commercial applications. To this end, it is recognized that virtually all commercial ductwork is substantially circular in cross-section. Therefore, outlet ports 32, 34 are preferably similarly substantially circular in cross-section, having a diameter of less than 11 inches. More preferably, each of first and second outlet ports 32, 34 has a diameter of approximately 8 inches. This preferred configuration facilitates a low-profile configuration for housing 14, such that an overall height H of housing is less than 14 inches, most preferably 11 inches.

Figure 3:
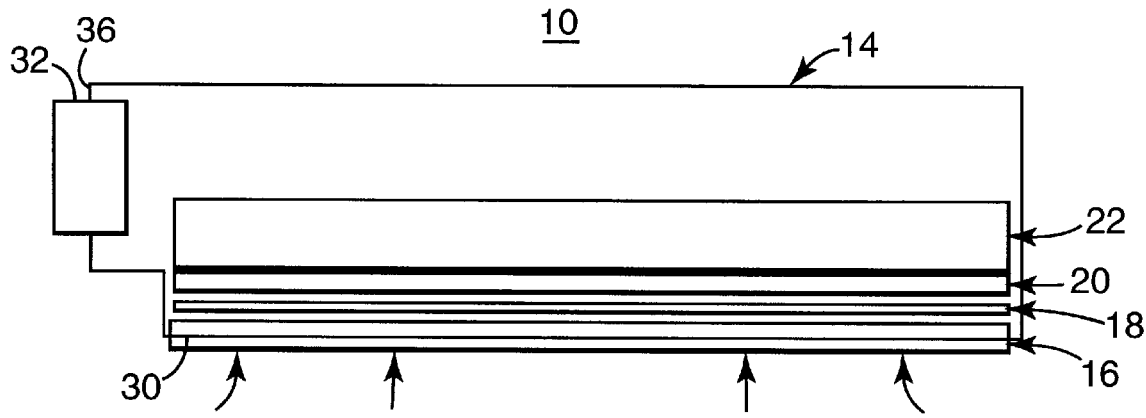
FIG. 3 is a front, cross-sectional view of filter module of FIG. 1 upon final assembly.

Final assembly of one preferred embodiment of filter module 10 is depicted in FIG. 3. Sorbent material filter 22 and primary particulate filter 20 are assembled within housing 14 as shown. In a preferred embodiment, sorbent material filter 22 and primary particulate filter 20 are coupled by a frame that is releasably attached to an interior of housing 14. Pre-filter 18 and grille 16 are similarly assembled within housing 14, with grille 16 encompassing air inlet 30. In one preferred embodiment, pre-filter 18 nests on top of grille 16 that, in turn, is secured to housing 14. Regardless, during use, airflow (shown with arrows in FIG. 3) enters filter module 10 at air inlet 30. Airflow passes through pre-filter 18, primary particulate filter 20 and sorbent material filter 22 for removal of air-borne contaminants and/or odors. The now "cleansed" air exists filter module 10 via outlet ports 32, 34 (only outlet port 32 is depicted in FIG. 3).

In one preferred embodiment, filter assembly 12 (FIG. 1) includes a 1inch thickness pre-filter 18, a 3-inch thickness primary particulate filter 20 and an 2.25-inch sorbent material filter 22. Requisite airflow can be achieved by forming outlet ports 32, 34 to have cross-sectional diameters of 8 inches. With this one preferred configuration, housing 14 has an overall height of less than 14 inches, most preferably 11 inches. As a point of reference, under these same constraints, housing 14 has a length (shown in FIG. 2) and a width of at least 20 inches. In fact, in one preferred embodiment, housing has a length of approximately 30 inches and a width of approximately 24 inches. Alternatively, other sizes are equally acceptable, and depend upon the composition of filter assembly 12. However, in the preferred embodiment, by forming at least two outlet ports 32, 34 in a side-by-side fashion, an overall height of housing 14, and thus a filter module 10, is less than 14 inches; most preferably approximately 11 inches.

Figure 4A:
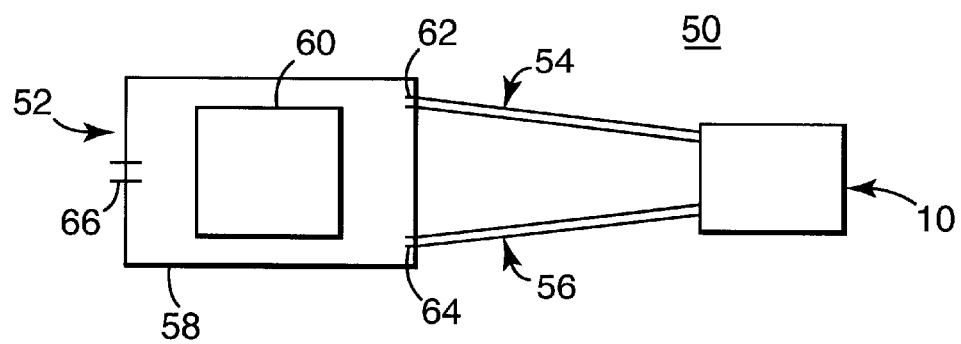
FIG. 4A is schematic view of a modular air-cleaning system in accordance with the present invention.

Filter module 10, as described above, is preferably utilized as part of an air-purifying system 50, an example of which is shown schematically in FIG. 4A. Air-purifying system 50 includes filter module 10, a blower module 52, a first duct 54 and a second duct 56. Filter module 10 is fluidly connected to blower module 52 by first duct 54 and second duct 56.

Blower module 52 can assume a wide variety of forms as known in the art. Preferably, however, blower module 52 includes a housing 58 maintaining a blower unit or fan 60. Housing 58 forms first and second inlets 62, 64 and at least one outlet 66. During use, blower unit 60 draws air into inlets 62, 64, and forces or exhausts air via outlet 66. In this regard, blower unit 60 can be an appropriately sized blower motor (e.g., $\frac{1}{3}$–5 horsepower motor); one or more fan(s); etc.

Ducts 54, 56 are preferably flexible, commercially-available aluminum ductwork, corresponding in size with outlet ports 32, 34 (FIG. 2) of filter module 10. Thus, in a preferred embodiment, each of ducts 54, 56 are substantially circular in cross-section, having a diameter of less than 11 inches. In one preferred embodiment, ducts 54, 56 have a diameter of approximately 8 inches. Regardless of exact size, however, ducts 54, 56 fluidly connect first and second outlet ports 32, 34 (FIG. 2) of filter module 10 to inlets 62, 64, respectively, of blower module 52. With the one preferred embodiment of filter module 10 described above (including primary particulate filter 20, and sorbent material filter 22, and outlet ports 32, 34 being 8 inches in diameter) blower unit 60 can be a $\frac{1}{3}$ horsepower motor operated at approximately 1600 RPM to achieve an airflow of in the range of 400–800 CFM, most preferably 575 CFM, through filter module 10.

Air-purifying system 50 depicted in FIG. 4A is but one example of an acceptable application of filter module 10.

Figure 4B:
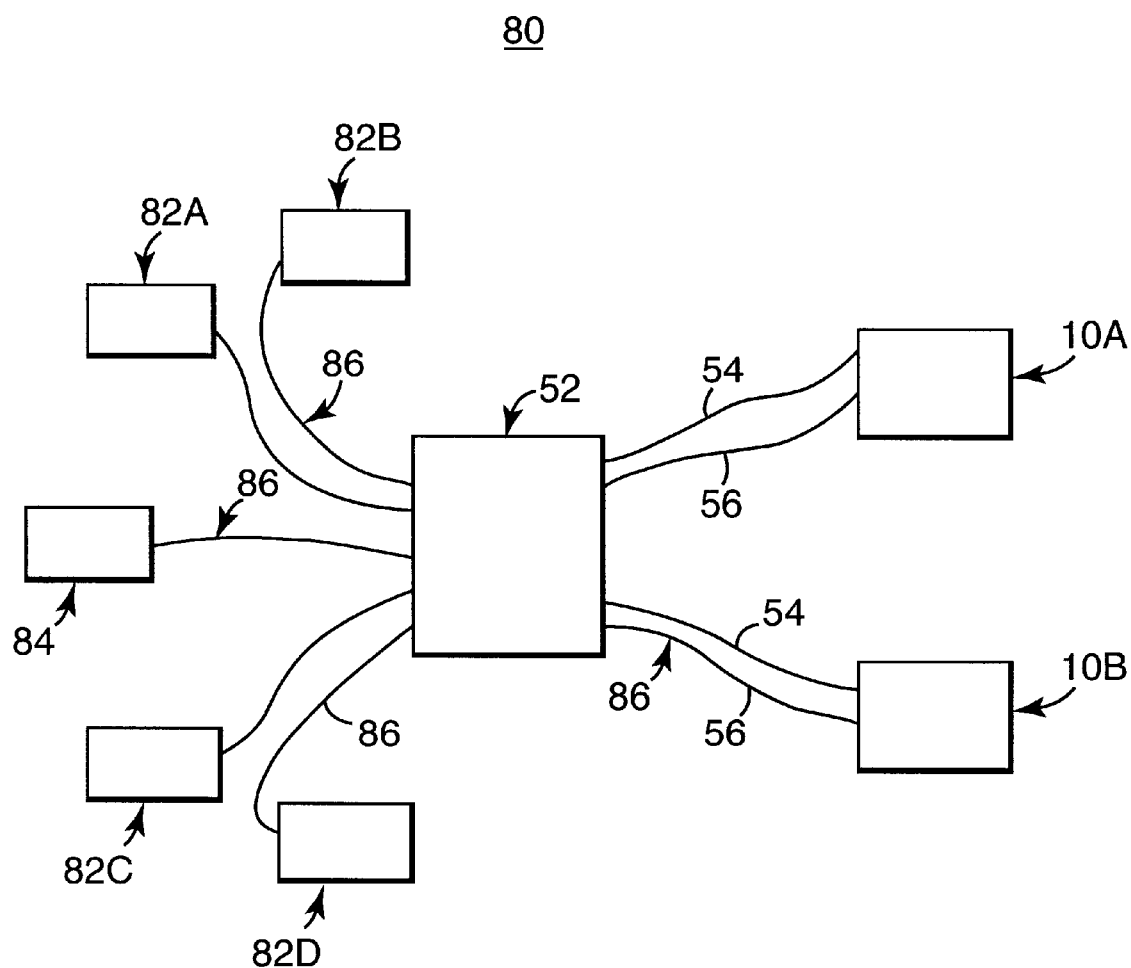
FIG. 4B is a schematic view of an alternative air-purifying system.

That is to say, air-purifying system 50 can include a number of other components in addition to those shown in FIG. 4A. For example, FIG. 4B depicts an alternative embodiment of an air-purifying system 80. Air-purifying system 80 includes blower module 52, filter modules 10A, 10B, supply modules 82A–82D and an exhaust 84. Each of filter modules 10A, 10B, supply modules 82A–82D and exhaust 84 are fluidly connected to blower module 52 by ductwork 86. For example, filter modules 10A, 10B are each fluidly connected to blower module 52 by ducts 54, 56, as previously described with reference to FIG. 4A.

Blower module 52 is as previously described. Similarly, filter modules 10A, 10B are preferably identical to filter module 10 (FIG. 1), previously described.

Supply modules 82A–82D can assume a wide variety of forms (e.g., shape, size and materials), but are preferably similarly constructed. In a preferred embodiment, each of supply modules 82A–82D includes a housing defining an air inlet and an air outlet. The air inlet is configured to be fluidly connected to blower module 52 by ductwork 86. With this configuration, air flow enters supply modules 82A–82D at air inlet and exits at air outlet. Exhaust 84 can be an open end of respective ductwork 86, or can include a separate module, similar for example to supply modules 82A–82D previously described.

During installation and use, air-purifying system 80 can be configured and modified to satisfy the needs of any area (or room) requiring air filtration or cleansing. For example, filter module 10A and supply modules 82A, 82B can be positioned over a first room; whereas filter module 10B and supply modules 82C, 82D can be positioned over a second room. Regardless, operation of blower module 52 draws air into filter modules 10A, 10B for removal of air-borne contaminants. Subsequently, blower module 52 forces the now "cleansed" air outwardly from system 80 via supply modules 82A–82D and/or exhaust 84.

Figure 5:
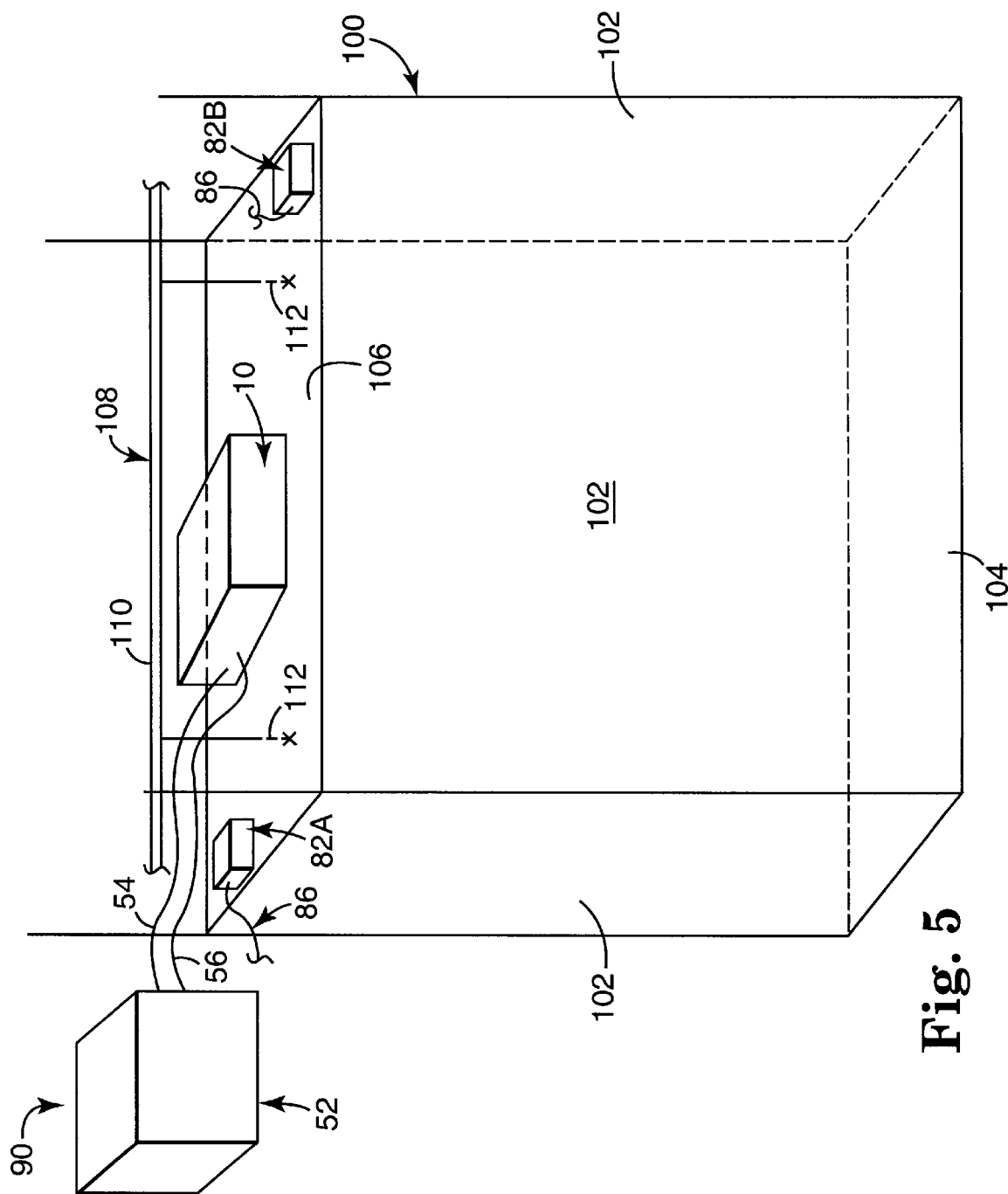
FIG. 5 is a perspective, schematic view of an air-purifying system in accordance with the present invention installed to a room.

Regardless of exact configuration, an air-purifying system incorporating a filter module in accordance with the present invention can be installed to virtually any area (or room) of interest. One example of an air-purifying system 90 applied to a room 100 is shown in FIG. 5. As a point of reference, airpurifying system 90 is similar to air-purifying system 50, 80 previously described and includes blower module 52, filter module 10 and supply modules 82A, 82B. Room 100 is generally defined by walls 102, a floor 104, ceiling 106 and auxiliary equipment 108. In most commercial settings, ceiling 106 is a "false" ceiling, comprised of a number of removable ceiling panels (not shown). With this configuration, various components of air-purifying system 90 can be installed and effectively hidden above ceiling 106, with certain of the ceiling panels removed to allow airflow into filter module 10 and out of supply modules 82A, 82B. Finally, auxiliary equipment 108 is normally pre-installed as part of a building's (or room 100) infrastructure and can include various equipment such as electrical wiring, light fixtures, HVAC ducts, hot and cold water pipes, etc. In the embodiment of FIG. 5, auxiliary equipment 108 is a sprinkler system including a water supply conduit 110 and sprinkler fixtures 112. Conduit 10 is fluidly connected to a water source (not shown) for supplying water to sprinkler fixtures 112. As will be understood by one of ordinary skill in the art, auxiliary equipment 108, such as conduit 110 and sprinkler fixtures 112, will have been previously installed to and/or above room 100. Auxiliary equipment 108 is effectively permanently installed, and cannot be readily altered or relocated. In this regard, auxiliary equipment 108 is typically closely spaced to ceiling 106. For example, conduit 110 is normally spaced from ceiling 106 by approximately 14 inches.

With the above constraints of room 100 in mind, blower module 52 is first installed. In a preferred embodiment, blower module 52 is positioned away from room 100 such that during operation, noise generated by blower module 52 will not affect occupants of room 100. Alternatively, however, blower module 52 can be installed above room 100, such as above ceiling 106. Filter module 10 is then installed over room 100. For many applications, optimal positioning of filter module 10 will be over a central portion of room 100. In the example shown in FIG. 5, however, auxiliary equipment 108, and in particular conduit 100, has been installed over this same central area. With available air filtration units, auxiliary equipment 108 would, therefore, obstruct a desired central location of a filter module (or a corresponding self-contained air-filtering unit.) In contrast, the preferred low-profile configuration of filter module 10, facilitates optimal positioning of filter module 10 relative to room 100. That is to say, in a preferred embodiment, filter module 10 has an overall height of less than 14 inches; more preferably approximately 11 inches. Most auxiliary equipment normally associated with commercial infrastructures (for example, conduit 110) will be located a distance slightly greater than 14 inches above ceiling 106. Thus, filter module 10 can be readily installed between auxiliary equipment 108 (such as conduit 110) and ceiling 106. Once installed, filter module 10 is fluidly connected to blower module 52 by ducts 54, 56. In this regard, a preferred flexible nature of ducts 54, 56 allows ducts 54, 56 to be routed or articulated around auxiliary equipment 108, such as sprinkler fixtures 112, and connected to blower module 52.

Supply modules 82A, 82B are then installed over room 100. Once installed, supply modules 82A, 82B are fluidly connected to blower module 52 by ductwork 86. For ease of illustration, ductwork 86 associated with supply modules 82A, 82B is shown partially.

Upon completion of system 90 installation, blower module 52 is operated to draw air of room 100 into filter module 10. Air passes through one or more filters maintained by filter module 10 (such as, for example, pre-filter 18, primary particulate filter 20 and sorbent material filter 22 previously described with reference to FIG. 1), for removal of air-borne contaminants. The cleansed air is then forced by blower module 52 back into room 100 via supply modules 82A, 82B. In a preferred embodiment, supply modules 82A, 82B are located at opposing regions of room 100 to establish a desired air re-circulation pattern within room 100.

An additional benefit associated with the low profile configuration of filter module 10 is an ability to locate two filter modules above room 100. With prior art air filtering units, auxiliary equipment 108 not only impedes optimal position of the filter unit, but oftentimes prevents installation of two units above a relatively heavily polluted room (such as a smoking room). Due to the low profile configuration, two separate filter modules 10 can be positioned above room 100 at virtually any location, and connected to blower module 52. The resulting air-purifying system effectively has twice the filtration airflow capacity for rapidly cleaning air of room 100.

The filter module and air-purifying system of the present invention provides a marked improvement over previous designs. By providing a filter module as a separate component apart from a blower module, the filter module can be located relative to a room of interest at a desired location. In this regard, the filter module assumes a low-profile configuration by incorporating at least two, side-by-side, relatively small outlet ports as opposed to a single, relatively large outlet port. With this design, an overall height of the filter module can be minimized while not adversely affecting airflow capacity. As a result, the filter module can be located virtually anywhere over a room of interest, without concern for the auxiliary equipment impediments otherwise present with prior art units and/or systems. Further, by preferably connecting the filter module to the blower module with flexible ductwork, the ductwork can easily be routed around permanent auxiliary equipment.

Although the present invention has been described with reference to preferred embodiments, changes can be made in form and detail without departing from the spirit or the scope of the present invention. For example, the filter module has been described as preferably forming two outlet ports. Alternatively, three or more outlet ports can be provided. Regardless of the exact number, by preferably positioning the outlet ports side-by-side, an overall height of the filter module can be minimized. Further, the filter module need include only a single filter material as opposed to a combination of a pre-filter, a primary particulate filter and sorbent material filter. Additionally, as should be clear from the various embodiments described, an air-purifying system incorporating a filter module in accordance with the present invention can assume a number of different configurations. For example, the system can include one or more blower modules, one or more filter modules, one or more supply modules, one or more exhausts, etc.

What is claimed is:

1. A filter module for use with a room air-purifying system, said filter module comprising:
    a housing forming an air inlet, a first outlet port and a second outlet port, said outlet ports configured for fluid connection to commercial ductwork; and
    a filter maintained by said housing, said filter configured to retain air-borne contaminants;
    wherein during use, airflow passes from said filter to said outlet ports.

2. The filter module of claim 1, wherein each of said outlet ports are circular in cross-section, having a diameter of less than 11 inches.

3. The filter module of claim 2, wherein each of said outlet ports have a diameter of approximately 8 inches.

4. The filter module of claim 1, wherein said outlet ports are formed sideby-side at a wall of said housing.

5. The filter module of claim 1, wherein said housing defines a length, width and height, said height being less than 14 inches.

6. The filter module of claim 5, wherein said height is approximately 11 inches.

7. The filter module of claim 5, wherein said length and said width are each at least 20 inches.

8. The filter module of claim 1, wherein said filter includes a primary particulate filter.

9. The filter module of claim 1, wherein said filter includes a sorbent material filter.

10. The filter module of claim 9, wherein said sorbent material filter comprises an encasement containing a granular sorbent material.

11. The filter module of claim 10, wherein said sorbent material filter includes at least 10 pounds of said granular sorbent material.

12. The filter module of claim 11, wherein each of said outlet ports are circular in cross-section, having a diameter of less than 11 inches.

13. The filter module of claim 1, wherein said housing is configured for assembly over a room.

14. A commercial air-purifying system comprising:
    a blower module;
    a filter module spaced from said blower module; and
    at least two ducts extending from said filter module to said blower module for fluidly connecting said filter module and said blower module.

15. The system of claim 14, wherein said filter module comprises:
    a housing forming an inlet, a first outlet port and a second outlet port, each of said outlet ports being fluidly connected to one of said ducts, respectively; and
    a filter maintained by said housing, said filter configured to retain air-borne contaminants.

16. The system of claim 15, wherein said outlet ports are formed by side-by-side at a wall of said housing.

17. The system of claim 15, wherein said housing defines a length, width and height, said height being less than 14 inches.

18. The system of claim 17, wherein said height is approximately 11 inches.

19. The system of claim 17, wherein said length and said width are each at least 20 inches.

20. The system of claim 15, wherein said filter includes a primary particulate filter.

21. The system of claim 15, wherein said filter includes a sorbent material filter.

22. The system of claim 15, wherein said sorbent material filter comprises an encasement containing a granular sorbent material.

23. The system of claim 22, wherein said sorbent material filter includes at least 10 pounds of said granular sorbent material.

24. The system of claim 15, wherein said housing is configured for assembly over a room.

25. The system of claim 14, wherein each of said ducts are flexible ductwork.

26. The system of claim 14, wherein each of said ducts are substantially circular in cross-section, having a diameter of less than 11 inches.

27. The system of claim 26, wherein said diameter of each of said ducts is approximately 8 inches.

28. The system of claim 14, further comprising:
    a second filter module spaced from said blower module; and
    at least two additional ducts fluidly connecting said second filter module to said blower module.

29. A method of installing an air-purifying system for cleansing room air, said method comprising:
    installing a blower module;
    providing a filter module having a housing and a filter maintained by said housing, said housing forming an inlet, a first outlet port and a second outlet port;
    installing said filter module over said room spaced from said blower module such that said inlet is positioned to receive air from said room;
    extending a first duct from said first outlet port to said blower module; and
    extending a second duct from said second outlet port to said blower module, wherein said ducts fluidly connect said blower module to said filter module;
    wherein said blower module operates to draw air of said room into said filter module for removal of air-borne contaminants.

30. The method of claim 29, wherein providing said filter module includes providing said housing with a height of less than 14 inches and providing said filter with a sorbent material filter.

31. The method of claim 30, wherein installing said filter module includes locating said filter module between auxiliary equipment associated with said room and a ceiling of said room.

32. The method of claim 30, wherein said first duct is a flexible ductwork and further wherein extending said first duct includes articulating said first duct about auxiliary equipment associated with said room.

* * * * *